J. L. Otis,
Edge-Tool Grinder.
No. 83,405. Patented Oct. 27, 1868.
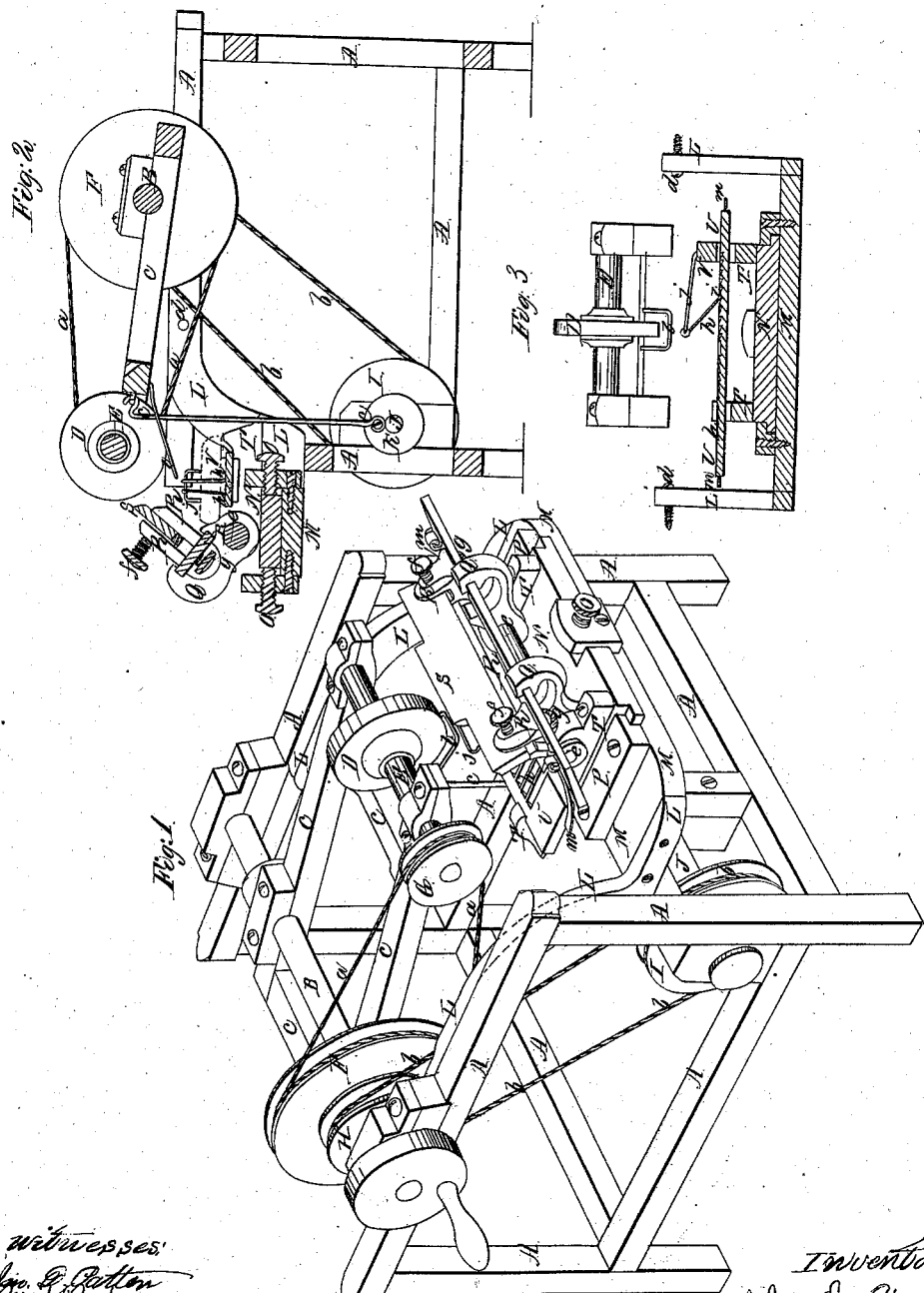

JOHN L. OTIS, OF LEEDS, MASSACHUSETTS.

Letters Patent No. 83,405, dated October 27, 1868.

IMPROVEMENT IN GRINDING-MACHINE.

The Schedule referred to in these Letters Patent and making part of the same.

*To all whom it may concern:*

Be it known that I, JOHN L. OTIS, of Leeds, in the county of Hampshire, and State of Massachusetts, have invented certain new and useful Improvements in Grinding-Machines; and I do hereby declare the following to be a full, clear, and exact description of the same, reference being had to the accompanying drawings, making a part of this specification, in which—

Figure 1 represents a perspective view of the machine.

Figure 2 represents a vertical section through the same.

Figure 3 represents a section through the feeding-carriage, and showing most of the feeding-mechanism.

Similar letters of reference, where they occur in the separate figures, denote like parts of the machine in all of the drawings.

I am aware that there are many grinding-machines in which the tool to be ground is clamped in a piece or frame, and moved across or past the face of the grinding-wheel; but in machines heretofore constructed for this purpose, the wheel or grindstone is made to revolve on its axis, in a stationary position, whilst the tool or article to be operated on is passed along its face. This gives to the edge of the knife or other thing being ground the form of a segment of a circle, corresponding with the circumference of the stone or wheel used, making the edge very thin and liable to break when a small wheel or stone is used; and to avoid this, wheels or grindstones of very large diameter had to be used to give a proper shape to the edge of the implement ground.

My invention consists in attaching an emery-wheel or grinding-stone of any kind to an arm or arms, which is caused to vibrate, oscillate, revolve, or roll on a centre, remote from the centre of said wheel or stone, whilst the tool or implement being ground is passed across its face, thereby making the edge of the tool more or less concave, according to the length of the arm or arms, to which the wheel or stone is attached, and not defined by the radius of said wheel or stone, or, in other words, so that a concave of large radius may be formed by a very small wheel, and thus making a much better edge to cutting-knives of any kind.

And my invention further consists in the combination of devices for feeding the clamping-bar and the tool to be ground past the face of the grindstone or emery-wheel.

To enable others skilled in the art to make and use my invention, I will proceed to describe the same by reference to the drawings, first premising that though I have mentioned the emery-wheel or grindstone as hung and operated in the vibrating arms or frame, it will be obvious to any mechanic that the clamping-frame may be thus hung and vibrated whilst the wheel or stone revolves in fixed bearings, and thus produce precisely the same effect by precisely the same means, and would be the same invention, and so regarded by me.

On the main frame, A, is supported, in suitable bearings, in which it may freely turn, rock, or roll, a shaft, B, driven by any suitable power and means, and from this shaft motion may be communicated to the other moving parts of the machine.

On this shaft B, for convenience of construction and operation, is hung a frame, C, which can vibrate on said shaft as a centre, and to the forward end of this frame is hung an emery-wheel or grindstone, D, by its shaft E, said shaft being revolved by the main shaft B, through an endless belt or band, $a$, passing over and around the pulleys F G, one on each of said shafts.

A second endless belt or band, $b$, passes from a pulley, H, on the shaft B, to and around a pulley, I, on a shaft, J, hung to the main frame underneath the shaft of the wheel or stone D, and to a crank or wrist-wheel, K, on the shaft J.

A pitman, $c$, extends up, and is connected to the frame C, so that as the wheel or stone is revolved in said vibrating frame, the latter is vibrated up and down by the pitman-connection $c$, and so that said stone or wheel has two motions, viz, one around its own shaft J, and the other around the shaft C.

Two bent arms, L L, pivoted or otherwise fastened to the main frame, as at $d$, fig. 2, project forward, and form a support for the table M, upon which is placed a carriage, N, that can be moved in and out by a set-screw, O, whilst it is guided in ways, P, on the table.

In arms Q Q, on the carriage N, (said arms being hung on a rod or through bolt $e$,) is placed a clamping-device, R, for holding the knife S, or other article to be ground, said clamping-device being furnished with set-screws, $f g$, for holding said article in proper position to be ground.

And in ways T, on said table N, is placed a plate, U, having ratchet-teeth, $h i$, in it, which teeth incline in different or opposite directions from the centre of said plate.

A spring-arm, $j$, extends from a block, V, which is fast on or a part of the carriage N, to about the centre of the table, or of the wheel or stone D, and between the two; and to this spring-arm is pivoted a reversible dog or pawl, $k$, which takes into one or the other of the sets of ratchet-teeth $h i$, as the case may be, and feeds said ratchet-plate U along on its ways T.

To the swinging frame C there is attached an arm, $l$, which, every time the frame swings down, strikes against the spring-arm $j$, and presses it down, and causes the pawl $k$ to act and move the ratchet-plate one notch. As the frame ascends, the spring-arm $j$ reacts, and brings the pawl into position for another feeding-motion, when the frame again descends.

On each end of the clamping-frame or device, R, there is a hinged arm, $m$, which, when thrown down, comes within the path of the ratchet-plate U, and when said plate comes against either of these arms, it carries through them the clamping-frame and article to be ground with it.

When the arms $m$ are swung up or back, clear of the ratchet-plate, of course there will be no feeding of the clamp or article to be ground. When the plate has moved in one direction to the extent of one set of its ratchet-teeth, and the swing-frame is up to its highest point, or practically so, the spring-arm $j$ can be raised up, the pawl $k$ reversed or swung in an opposite direction, and it will then feed the plate the other way, and so on.

As before stated, it is obvious that if the shaft of the wheel or stone were revolved in fixed bearings, and the clamping-bar R were hung in a frame or arms vibrating around the shaft B, or other remote point from the grindstone in that direction, and the clamp and article to be ground were thus moved past the stone, the same result would be attained, that is, a concave or segment of a very large circle would be ground, however small the grinding-stone or wheel might be.

The arms L, to which the table, carriage, clamp, and ratchet-plate are all united, as also the article to be ground, when in the clamp or holder, are pivoted to the main frame by the screws or pivots $d$, and the whole may be vibrated on said pivots during the process of grinding; or they may be properly adjusted, and when so held in that position, by pins passing through holes in said arms and into the main frame, or other known holding-devices.

Having thus fully described my invention, What I claim therein as new, and desire to secure by Letters Patent, is—.

In a grinding-machine, in which the article to be ground is moved past the face of the grinding-wheel or stone, the hanging of either the stone or wheel, or of the clamp-frame that carries the thing to be ground, in arms or a swinging frame, whose centre of motion is remote from the centre of motion of the wheel or stone, for the purpose of grinding the tool or implement on a concave from a greater radius than that of the stone or wheel, substantially as described.

Also, the feeding along of the tool or article to be ground, past the face of the wheel or grindstone, by means of the vibrating frame, reversible pawl, and its spring-arm or support, and the ratchet-plate, acting together in the manner and for the purpose described.

J. L. OTIS.

Witnesses:
  L. DIMOCK,
  GEORGE H. RAY.